United States Patent
Kim et al.

(10) Patent No.: US 6,929,459 B2
(45) Date of Patent: Aug. 16, 2005

(54) METHOD AND APPARATUS FOR MANUFACTURING POLYURETHANE FOAM INJECTED WITH STRAND MATS

(75) Inventors: Jong Sik Kim, Milyang-si (KR); Young Soo Kwon, Milyang-si (KR); Jung Meung Roh, Kinhea-si (KR)

(73) Assignee: Han Kuk Fiber Glass Co., Ltd., Kyungsangnam-do (KR)

( * ) Notice: Subject to any disclaimer, the term of this patent is extended or adjusted under 35 U.S.C. 154(b) by 293 days.

(21) Appl. No.: 10/187,283

(22) Filed: Jul. 2, 2002

(65) Prior Publication Data

US 2003/0034579 A1 Feb. 20, 2003

(30) Foreign Application Priority Data

Jul. 7, 2001 (KR) .......................................... 2001-40633

(51) Int. Cl.[7] .......................... B29C 44/28; B29C 44/32
(52) U.S. Cl. ....................... 425/4 C; 425/112; 425/373; 425/817 C
(58) Field of Search .............................. 425/373, 817 C, 425/4 C, 112, 387.1; 19/98, 106 R

(56) References Cited

U.S. PATENT DOCUMENTS

| | | | | |
|---|---|---|---|---|
| 4,121,957 A | * | 10/1978 | Allen | .......................... 156/79 |
| 4,279,060 A | * | 7/1981 | Wirth | ....................... 19/106 R |
| 4,475,271 A | * | 10/1984 | Lovgren et al. | .............. 19/105 |
| 6,265,047 B1 | * | 7/2001 | Chapuis et al. | ............. 428/111 |

* cited by examiner

*Primary Examiner*—Allan R. Kuhns
(74) *Attorney, Agent, or Firm*—Greenblum & Bernstein, P.L.C.

(57) ABSTRACT

A method and an apparatus for manufacturing a polyurethane foam injected with strand mats. After a polyurethane foam solution is sprayed on the strand mats, the strand mats are moved upward and downward by prominences and depressions and then intermittently pressed by a pressing device, thereby the air in the strand mats being exhausted to the outside. Therefore, the polyurethane foam solution uniformly permeates into the strand mats. As a result, the insulating effect and mechanical strength of the polyurethane foam are increased, uniform surface with no air spaces is obtained, the mechanical properties are made uniform, and shrinkage, cracking, distortion and the like are prevented under a super-low temperature such as less than −165° C.

7 Claims, 6 Drawing Sheets

METHOD AND APPARATUS FOR MANUFACTURING POLYURETHANE FOAM INJECTED WITH STRAND MATS

BACKGROUND OF THE INVENTION

1. Field of the Invention

The present invention relates to a polyurethane foam injected with strand mats, and more particularly to a method and an apparatus for manufacturing a polyurethane foam injected with strand mats, in which the upper surface of the polyurethane foam is made uniform and the physical properties such as the tensile strength, compression strength and the like of the polyurethane foam are equalized, resulting from maximally removing air spaces in the strand mats when the strand mats are immersed in a polyurethane foam solution.

2. Description of the Related Art

Generally, polyurethane foam is a porous material in the form of sponge, produced by a chemical reaction of a polyol and an isocyanate, along with other additives. It is divided into a flexible polyurethane foam and a rigid polyurethane foam. The flexible polyurethane foam is used primarily as a cushioning material such as a matrix and the rigid polyurethane foam is utilized mainly as an insulating material. The present invention focuses on the rigid polyurethane foam used for an insulating material, and in particular, a method and an apparatus for manufacturing a polyurethane foam reinforced with glass fibers, used as a cold-insulating material for a ship intended for transporting mainly a super-low temperature substance such as liquefied natural gas (LNG).

As shown in FIG. 1, a conventional manufacturing method of a polyurethane foam injected with strand mats comprises the steps of: continuously supplying and transferring the strand mats made with glass fiber, spraying a polyurethane foam solution on the strand mats so as to immerse the strand mats in the polyurethane foam solution, foam molding the polyurethane foam solution into a polyurethane foam after a designated time, and taking out the completed polyurethane foam from the manufacturing apparatus.

The strand mat is produced by binding glass fibers of less than 25 microns with a polyester binder to maintain the shape of the mat. In this case, the amount of the polyester binder must be minimized within an extent that the shape of the mat is maintained. Generally, the polyester binder is used in the range of 1.3 to 3 weight % of the strand mat.

Strand mat is supplied in a manner such that multiple strand mats are laminated, and then a polyurethane foam solution is sprayed on the laminated strand mats. When the strand mats are immersed in the polyurethane foam solution, a large number of air spaces are present in the strand mats. Generally, the air in the strand mats is exhausted outside the strand mats while the strand mats are immersed in the polyurethane foam solution. Then, the space that the air has been exhausted is filled with the polyurethane foam solution.

At a designated time after the strand mats are immersed in the polyurethane foam solution, the polyurethane foam solution is foam molded. However, air that is not exhausted to the outside in time, remains in a produced polyurethane foam, resulting in adversely influencing on insulation property of the polyurethane foam. Furthermore, the surface of the molded polyurethane foam is not uniform and a variety of the physical properties of the polyurethane foam are not uniform. As a result, the quality of the polyurethane foam is deteriorated.

More specifically, in the conventional method for manufacturing a polyurethane foam injected with strand mats, after the polyurethane foam solution is sprayed on the strand mats, it is foamed in a state wherein the air between glass fibers in the strand mats is not completely exhausted to the outside. As a result, a large number of air spaces are present in the molded polyurethane foam, resulting in the strength and cold-insulating effect of the polyurethane foam being reduced. Therefore, shrinkage, cracking and distortion and the like are caused in the polyurethane foam under a super-low temperature condition, or the polyurethane foam is liable to be broken by an external impact.

SUMMARY OF THE INVENTION

Therefore, the present invention has been made in view of the above problems, and it is an object of the present invention to provide a method and an apparatus for manufacturing a polyurethane foam injected with strand mats, in which shrinkage, cracking, distortion and the like do not occur under a super-low temperature condition and tensile strength and compression strength are improved, resulting from removing the air spaces in the strand mats rapidly, simultaneously with facilitating the immersion of the strand mats in a polyurethane foam solution before the polyurethane foam solution is foamed after being sprayed on the strand mats.

In accordance with one aspect of the present invention, the above object and other objects can be accomplished by the provision of a method for manufacturing a polyurethane foam injected with strand mats, comprising the steps of continuously supplying and transferring the strands mats from multiple winding rollers (first step); spraying a polyurethane foam solution on the continuously transferred strand mats (second step); exhausting air outside the strand mats immersed in the polyurethane foam solution (third step); and foam molding the polyurethane foam solution surrounding the air-exhausted strand mats (fourth step).

Preferably, the third step of exhausting air outside the strand mats may comprise transferring the strand mats in a state wherein the strand mats immersed in the polyurethane foam solution are moved upward and downward.

More preferably, the third step may comprise pressing the upper side of the strand mats intermittently so as to exhaust air outside the strand mats.

In accordance with another aspect of the present invention, there is provided an apparatus for manufacturing a polyurethane foam injected with strand mats, comprising: a basal plate; multiple winding rollers, around which the strand mats are wound, installed at the upper side of the basal plate; a conveyor, installed in the basal plate, transferring laminated multiple strand mats; and a polyurethane foam solution supply device, installed at the upper side of the basal plate, spraying the polyurethane foam solution on the transferred strand mats; wherein the improvement is characterized in that an air exhausting device, which exhausts air outside the strand mats, is installed at a rearward position separated by a predetermined distance from the polyurethane foam solution supply device.

Preferably, the air exhausting device may include prominences and depressions formed on the basal plate so as to enable the strand mats to be moved upward and downward while being transferred.

More preferably, the air exhausting device may include a pressing device, which exhausts air outside the strand mats in a manner such that the pressing device presses the strand mats intermittently while being rotated.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the method and apparatus for manufacturing a polyurethane foam injected with strand mats of the present invention will be described in detail with reference to the accompanying figures.

Figure 1:
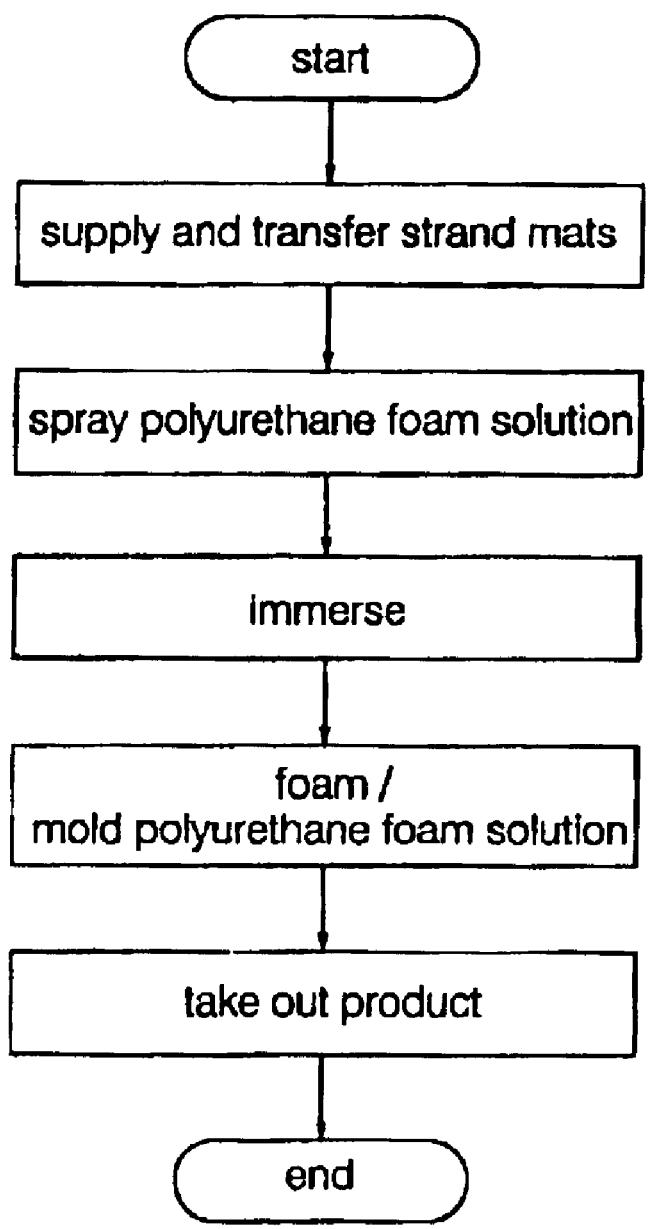
FIG. 1 is a block diagram showing a conventional method for manufacturing a polyurethane foam injected with strand mats.
Figure 2:
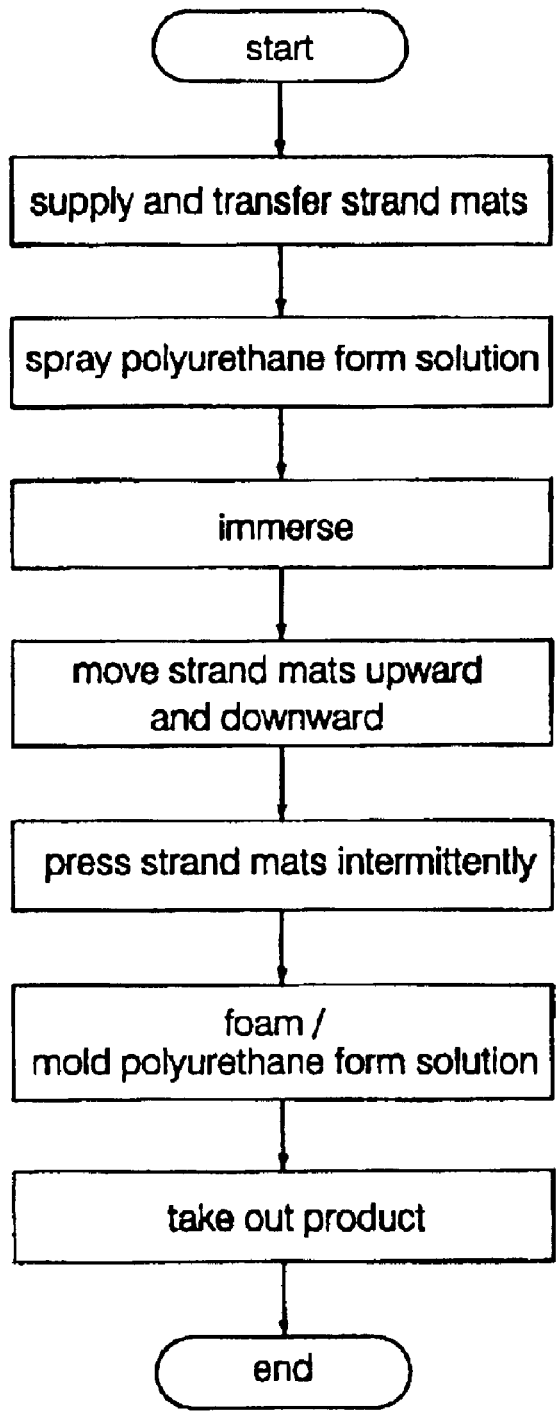
FIG. 2 is a block diagram showing an inventive method for manufacturing a polyurethane foam injected with strand mats.

As shown in FIG. 2, the manufacturing method of a polyurethane foam injected with strand mats according to the present invention comprises the steps of: continuously supplying and transferring the strand mats from multiple winding rollers (first step); spraying a polyurethane foam solution on the continuously transferred strand mats (second step); making the strand mats immersed in the polyurethane foam solution move upward and downward and pressing the upper side of the strand mats intermittently so as to exhaust air outside the strand mats (third step); foam molding the polyurethane foam solution surrounding the air-exhausted strand mats (fourth step); and taking out the completed polyurethane foam from the manufacturing apparatus (fifth step).

Figure 3:
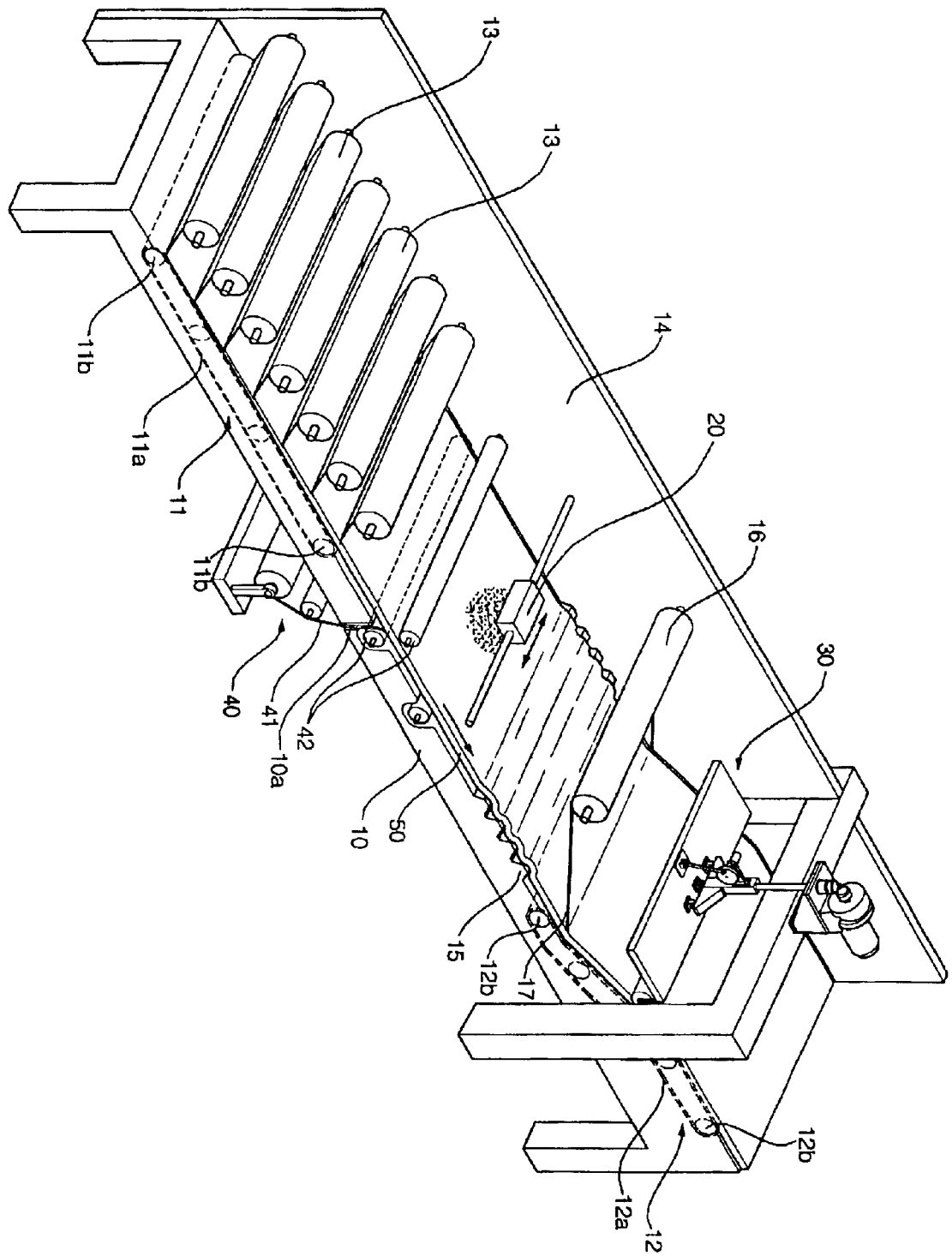
FIG. 3 is a perspective view showing an apparatus for manufacturing a polyurethane foam injected with strand mats.

As shown in FIG. 3, the manufacturing apparatus of a polyurethane foam injected with strand mats according to the present invention, consists of:a basal plate 10; multiple winding rollers 13, around each of which the strand mat 50 is wound, installed on the upper side of the basal plate 10; a first and second conveyors 11,12, which are installed in the basal plate 10, so as to transfer the laminated multiple strand mats 50 supplied from the winding rollers 13; a polyurethane foam solution supply device 20, which is installed on the upper side of the basal plate 10 between the first and second conveyors 11,12, so as to spray the polyurethane foam solution on the transferred strand mats 50; and an air exhausting device, which is installed at a rearward position separated by a predetermined distance from the polyurethane foam solution supply device 20, so as to exhaust air outside the transferred strand mats 50.

The air exhausting device consists of prominences and depressions 15 formed on the basal plate so as to enable the strand mats 50 to be moved upward and downward during transfer, and a pressing device 30, pressing the upper side of the strand mats 50 intermittently.

Side walls 14 are installed on both sides of the basal plate 10, and the first and second conveyors 11,12 are installed in front of and behind the basal plate 10, respectively. The first and second conveyors 11,12 are installed at positions separated by a predetermined distance from each other and each consists of conveyor belts 11a,12a and driving rollers 11b, 12b. The side walls 14 are formed with aligned multiple winding rollers 13, around each of which the strand mat 50 is wound. Accordingly, the strand mats unwound from multiple winding rollers 13 are laminated as many layer as the number of the winding rollers 13 and transferred by the conveyor belt 11a. The second conveyor 12 is a kind of a slat conveyor and pulls the laminated strand mats 50 immersed in a polyurethane foam solution.

In addition, a passage 10a is defined in an approximately vertical orientation on the basal plate 10 at a rearward position separated by a predetermined distance from an end of the first conveyor 11. A release paper supply device 40 is installed at the lower side of the basal plate 10 to supply a release paper 41 through the passage 10a. A guide roller 42 is installed in each of the upper and lower sides of the exit of the release paper supply device 40 to guide the supply of the release paper 41. Therefore, the release paper 41 is interposed between the lower surface of the strand mats 50 and the upper surface of the basal plate 10. The release paper 41 prevents direct contact between the polyurethane foam solution and the basal plate when the polyurethane foam solution is sprayed on the strand mats 50.

The release paper 41 is supplied from the release paper supply device 40 to the lower side of the strand mats 50 in front of the polyurethane foam solution supply device 20. Prominences and depressions 15 are formed on the basal plate 10 in a rearward position separated by a predetermined distance from the polyurethane foam supply device 20, so as to enable the strand mats 50 immersed in the polyurethane foam solution to be transferred while being moved upward and downward.

A paper supply device 16 is installed behind the prominences and depressions 15 so as to cover the upper surface of the strand mats 50 with a paper 17. A pressing device 30 is installed behind the paper supply device so as to press the upper side of the strand mats 50 intermittently and exhaust air outside the strand mats 50. The pressing device 30 presses the strand mats 50 in a state wherein the upper surface of the strand mats is covered with the paper 17.

The polyurethane foam solution supply device 20 is a device for spraying the polyurethane foam solution formed by mixing a polyol and an isocynate. It has a width less than that of the basal plate 10 (see FIG. 3). This device sprays the polyurethane foam solution while being repeatedly moved back and forth.

Figure 4:
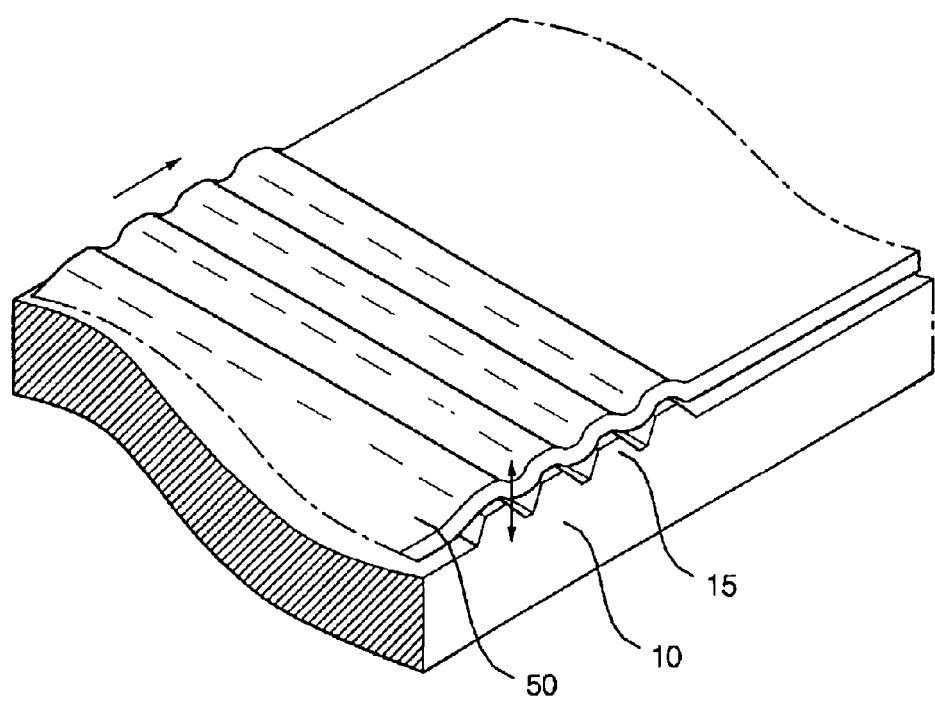
FIG. 4 is an exploded perspective view of prominences and depressions shown in FIG. 3.

FIG. 4 is an exploded perspective view of the prominences and depressions 15 forming a main part of the present invention. The prominences and depressions 15 are formed on the upper surface of the basal plate 10, its cross section is trapezoidal and projecting parts are separated from each other by a designated distance. While the strand mats 50 pass through the upper surface of the prominences and depressions 15, they are moved upward and downward. Therefore, the polyurethane foam solution completely permeates into the glass fibers of the strand mats 50 and the air in the strand mats 50 is exhausted to the outside. The material of the prominences and depressions 15 may be a complex material, a metal and the like, but it is preferable to use a complex material, in which workability is good, degree of bending is small, and dimensional stability is high.

Figure 5:
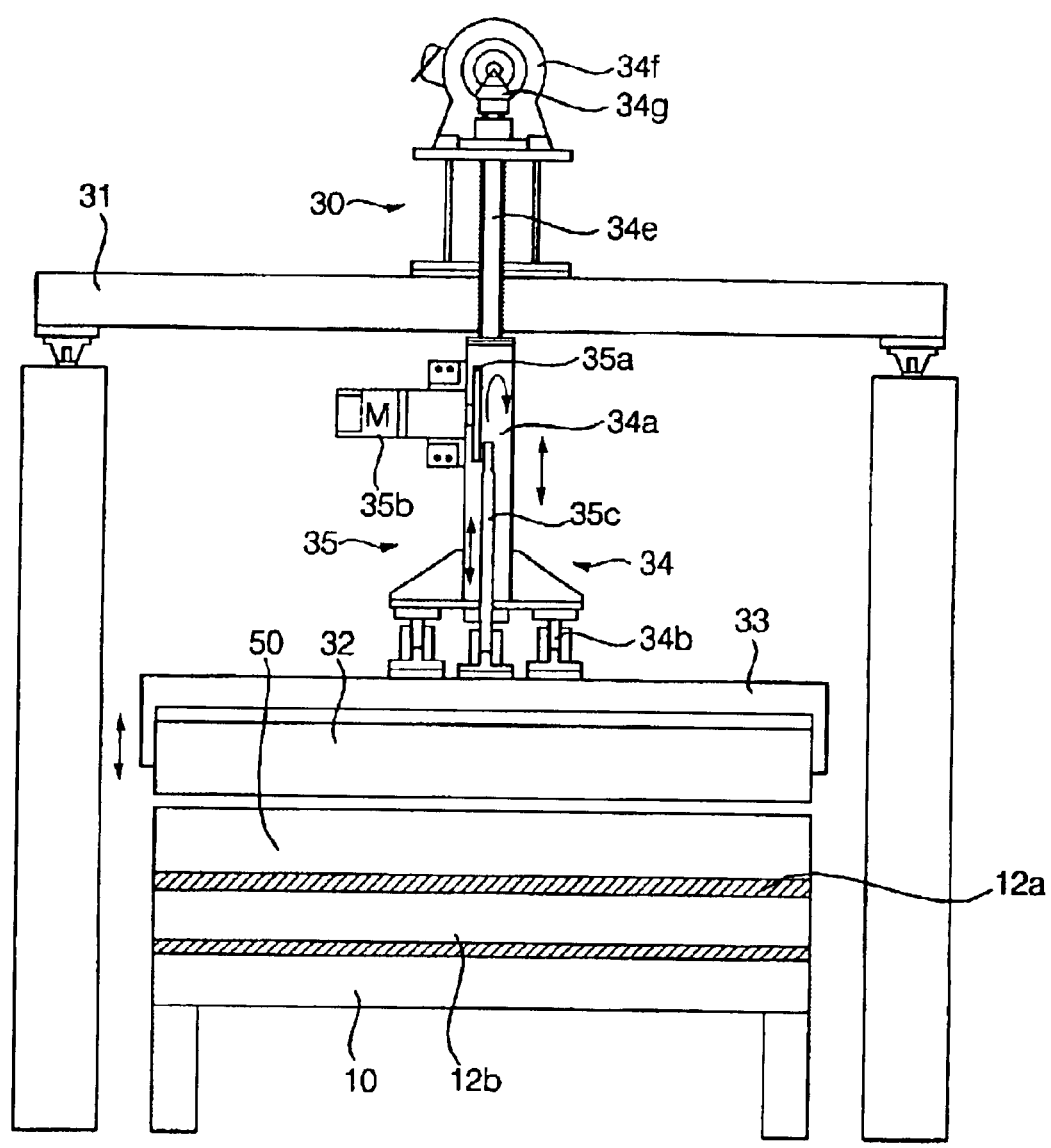
FIG. 5 is an exploded front view of a pressing device shown in FIG. 3.
Figure 6:
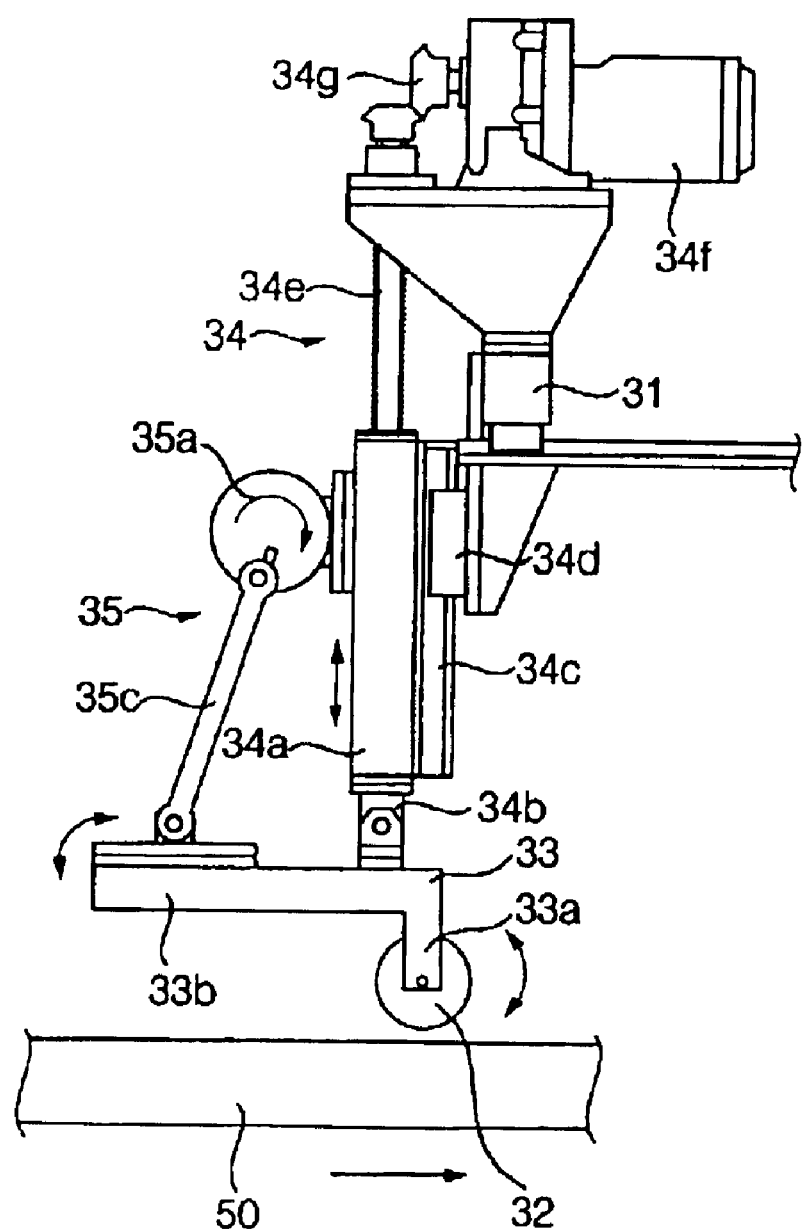
FIG. 6 is a side view of the pressing device shown in FIG. 5.

As shown in FIGS. 5 and 6, the pressing device 30 consists of a pressing roller 32, exhausting air outside the strand mats 50 in a manner such that it presses the strand mats 50 intermittently while being rotated; a support member 33, supporting the pressing roller 32 to be rotated; a position adjusting means 34, which is connected to the upper side of the support member 33, so as to enable the support member 33 to be moved upward and downward; and an intermittent operating means 35, which is installed at one side of the position adjusting means 34 and connected to the support member 33, changing an angle of the support member 33 thereby to adjust the degree to which the pressing roller 32 presses the strand mats 50.

The support member 33 has a shape of a laid-down and inverted L, in which its short end 33*a* extending vertically is joined with the pressing roller 32 so as to enable the pressing roller to be rotated and its long end 33*b* extending horizontally is hingedly connected to the intermittent operating means 35. The upper side of the support member 33 is hingedly connected to the position adjusting means 34. The position adjusting means 34 consists of a position adjusting motor 34*f* installed at the upper side of the support 31 fixed in the basal plate 10; a position adjusting member 34*a*, the one side of which a slider 34*c* is attached thereto and connected to a guide 34*d* installed at the lower portion of the support 31 to be moved upward and downward; multiple connecting parts 34*b*, installed at the lower side of the position adjusting member 34*a* and hingedly connected to the support member 33; and a screw shaft 34*e*, threadedly coupled with the position adjusting member 34*a*, raising and lowering the position adjusting member 34*a* in a manner such that it is rotated by driving force transmitted through a bevel gear part 34*g* when the position adjusting motor 34*f* operates.

The intermittent operating means 35 consists of a motor 35*b* installed on one side of the position adjusting member 34*a*; a plate-shaped drum 35*a* rotated by the motor 35*b*; and an arm 35*c*, in which one end is hingedly connected to the edge portion of the drum 35*a* and the other end is hingedly connected to the long end 33*b* of the support member 33. Therefore, when the drum 35*a* is rotated by the motor 35*b*, the eccentric arm 35*c* is moved periodically upward and downward. In this state, the support member 33 connected to the lower end of the arm 35*c* rotates about the connecting part 34*b*. As a result, the pressing roller 32 installed at the lower end of the support member 33 is raised and lowered periodically, thereby pressing the strand mats 50 positioned under the support member intermittently.

Accordingly, because the pressing roller 32 is rotated to press the upper surface of the strand mats 50 intermittently, the air present in the strand mats 50 is exhausted to the outside. The reason why pressure is intermittently applied is that where the strand mats 50 are continuously pressed, an earlier sprayed-polyurethane foam solution interferes with a freshly sprayed-polyurethane foam solution and thus stress occurs in the strand mats. As a result, a poor quality of polyurethane foam is obtained.

The pressing device 30 is driven to apply a suitable pressing force to the strand mats 50. The pressure applied by the pressing device 30 is preferably adjusted to an extent that the polyurethane foam solution is slightly stagnated in the upper surface of the strand mats 50.

Hereinafter, the operating procedure of an apparatus for manufacturing a polyurethane foam injected with strand mats will be described in detail.

Multiple winding rollers 13, around each of which the strand mat 50 is wound, are installed at both side walls 14 of a basal plate 10. If electric power is applied, the strand mats 50 are transferred by a first conveyor 11. The number of the strand mats 50 transferred by the first conveyor 11 depends on the number of the winding rollers 13 and can be adjusted as necessary. A release paper 41 is supplied from a release paper supply device 40 installed at the lower side of the basal plate 10 and is interposed between the strand mats 50 and basal plate 10.

When the strand mats 50, the lower side of which the release paper 41 is placed at, pass through the lower portion of a polyurethane foam solution supply device 20, the polyurethane foam solution is sprayed on the strand mats 50 by the polyurethane foam solution supply device 20. The polyurethane foam solution consists of a polyol, an isocyanate, a reaction catalyst, an additive, a blowing agent and the like.

The strand mats 50 immersed in the polyurethane foam solution are moved upward and downward during passing through prominences and depressions 15 formed on the basal plate 10. Therefore, the polyurethane foam solution exhausts air outside the strand mats 50 and completely permeates into the strand mats 50. Then, the upper surface of the strand mats 50 is covered with a paper 17 supplied from a paper supply device 16.

Then, when the strand mats 50 pass through the lower side of a pressing device 30, the pressing device 30 presses the paper-covered strand mats 50 intermittently to exhaust the air that still remains in the strand mats 50.

Specifically, when a position adjusting motor 34*f* is operated, a screw shaft 34*e* power-driven by a bevel gear part 34*g* is rotated. As the screw shaft 34*e* is rotated, a position adjusting member 34*a* is moved upward and downward by a guide 34*d*. According to the thickness of the strand mats 50, the high and low limits of actuation of a support member 33 and the pressing force applied to the strand mats 50 are varied.

When a motor 35*b* installed on the side of the position adjusting member 34*a* is driven, a drum 35*a* is rotated. As the drum 35*a* is rotated, an arm 35*c* eccentric to the drum 35*a* moves a long end 33*b* of the support member 33 upward and downward. In this state, the support member 33 rotates about a connecting part 34*b*, which is connected to both the support member 33 and the position adjusting member 34*a*. Therefore, a pressing roller 32 presses the strand mats 50 intermittently. As a result, the air that is not exhausted to the outside is mostly exhausted. Furthermore, as the pressing roller 32 presses the upper side of the strand mats 50, the upper surface of the strand mats 50 immersed in the polyurethane foam solution is flatted.

In addition, because strand mats 50 are pressed intermittently, an earlier sprayed-polyurethane foam solution does not interfere with a freshly sprayed-polyurethane foam solution. Therefore, a good quality of polyurethane foam is obtained. After the above whole procedure is carried out, the polyurethane foam solution in the strand mats 50 is foam molded after a designated time. Because the upper surface of the strand mats 50 is flatted, the surface of the polyurethane foam is made uniform and the mechanical properties such as the tensile strength and the compression strength of the polyurethane foam are relatively uniform.

It may be understood that because the polyurethane foam solution is not foam molded until the strand mats 50 pass through the pressing device 30, the time when the strand mats 50 pass through the prominences and depressions 15 and pressing device 30, does not have to be very long. The foam molded polyurethane foam is completely hardened and then is taken out as a product.

EXAMPLES

Table 1 shows physical properties upon variation in the composition ratio of the polyurethane foam solution components, and whether or not the strand mats pass through the prominences and depressions and pressing device. HCFC-14b is dichloro monofluoromethane and CSM is continuous strand mat.

In comparative example 1, its polyurethane foam solution was formed by mixing polyol:isocyanate:HCFC-141b:water in a weight ratio of 100:130:7:0.3. Although the strand mats were somewhat easily immersed in the polyurethane foam solution due to relative low viscosity (700 cps) of HCFC-141b, the nonimmersion was measured to be 1 $EA/M^2$ and the amount of air spaces in the strand mats exceeded the standard by a small amount.

In comparative example 2, only water was used as a blowing agent. Due to the increase of viscosity, the strand mats were not easily immersed in the polyurethane foam solution. The nonimmersion was measured to be 4 to 5 $EA/M^2$ and many air spaces were formed in the polyurethane foam.

In comparative example 3, although its polyurethane foam was injected with a 6-layered strand mat, the amounts of nonimmersion and air spaces were not different from the comparative example 2.

Meanwhile, in example 1, polyurethane foam solution-sprayed strand mats passed through the prominences and depressions 15 while being moved upward and downward. As a result, the air in the strand mats was partially exhausted to the outside. In this case, the loss rate of the product was reduced to 27.2% due to the improved immersion, but quality of the product was not so good.

In example 2, polyurethane foam solution-sprayed strand mats passed through the prominences and depression portions 15 formed on the upper surface of the basal plate 10 and then were continuously pressed by the pressing device 30, thereby the air in the strand mats being exhausted to the outside. In this case, immersion was improved and the loss rate of the product and the amount of nonimmersion were reduced, compared with the example 1. However, due to continuous pressing by the pressing device 30, a polyurethane foam solution moved toward upstream interfered with a freshly sprayed-polyurethane foam solution and thus poor quality polyurethane foam was produced.

In example 3, its strand mats passed through the prominences and depressions 15 and were intermittently pressed by the pressing device 30. The prominences and depressions 15 exhausted air outside the strand mats while the stand mats were moved upward and downward after being immersed in the polyurethane foam solution. And then, the pressing device 30 exhausted air that still remained in the strand mats by an intermittent pressing. In this case, an earlier sprayed-polyurethane foam solution moved toward upstream by the pressing device did not interfere with a freshly sprayed-polyurethane foam solution. As a result, the physical properties of the polyurethane foam were relatively uniform and the loss rate thereof was substantially reduced.

As apparent from the above description, the present invention provides a method and an apparatus for manufacturing a polyurethane foam injected with strand mats, in which nonimmersion is not detected, insulating effect and mechanical strength are increased, uniform surface is obtained, no air spaces are seen in cross section, the mechanical properties such as tensile strength and compression strength are uniform, and shrinkage, cracking, distortion and the like are prevented under a super-low temperature such as less than −165° C., resulting from exhausting air outside the strand mats using prominences and depressions and pressing device.

TABLE 1

|  |  |  | Comp. 1 | Comp. 2 | Comp. 3 | Examp. 1 | Examp. 2 | Examp. 3 |
|---|---|---|---|---|---|---|---|---|
| Composition ratio | Polyol |  | 100 | 100 | 100 | 100 | 100 | 100 |
|  | Isocyanate |  | 130 | 130 | 130 | 140 | 130 | 140 |
|  | Blowing agent | HCFC-141b | 7 |  |  |  |  |  |
|  |  | Water | 0.3 | 0.93 | 0.93 | 0.95 | 0.93 | 0.95 |
| Viscosity of polyol (cps) |  |  | 700 | 1200 | 1200 | 1200 | 1170 | 1200 |
| Number of layers of CSM |  |  | 7 | 7 | 6 | 7 | 7 | 7 |
| Free foam density (kg/m¹) |  |  | 104.2 | 105.2 | 103.2 | 106 | 102.4 | 104.9 |
| Product density (kg/m¹) |  |  | 121.6 | 121.5 | 123.5 | 124.5 | 120.2 | 120.9 |
| Product thickness (mm) |  |  | 230 | 230 | 225 | 220 | 210 | 210 |
| Loss rate of product (%) |  |  | 30.26 | 30.20 | 28.7 | 27.2 | 23.6 | 23.6 |
| Time required for immersion (sec) |  |  | 90 | 100 | 100 | 100 | 100 | 100 |
| Amount of nonimmersion ($EA/M^2$) |  |  | 1 | 4–5 | 3 | 1 | 0 | 0 |
| Amount of air spaces |  |  | A few | Many | Many | Few | Few | Few |
| Used device |  |  |  |  |  | Prominences and depressions | Prominences and depressions, pressing device, continuous pressing | Prominences and depressions, pressing device, Intermittent pressing |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for manufacturing strand mats filled with a polyurethane foam, comprising:
    a basal plate;
    multiple winding rollers, around each of which the strand mat is wound, installed at an upper side of the basal plate;
    a conveyor, which is installed in the basal plate, that transfers laminated multiple strand mats;
    a polyurethane foam solution supply device, which is installed at the upper side of the basal plate, that sprays the polyurethane foam solution on the transferred strand mats; and an air exhausting device, which exhausts air outside the strand mats, is installed at a rearward position separated by a predetermined distance from the polyurethane foam solution supply device, wherein the air exhausting device includes protrusions and depressions formed on the basal plate so as to enable the strand mats to be moved upward and downward while being transferred.

2. The apparatus as set forth in claim 1, wherein the air exhausting device includes a pressing device, which exhausts air outside the strand mats in a manner such that the pressing device presses the strand mats intermittently while being rotated.

3. The apparatus as set forth in claim 2, wherein the pressing device includes:

a pressing roller, exhausting air outside the strand mats in a manner such that it presses the strand mats intermittently while being rotated;

a support member, supporting the pressing roller to be rotated;

a position adjuster, which is connected to the upper side of the support member, so as to enable the support member to be moved upward and downward; and an intermittent operator, changing an angle of the support member thereby to adjust the degree to which the pressing roller presses the strand mats.

4. The apparatus as set forth in claim 3, wherein the position adjuster includes:

a position adjusting motor, which is installed at the upper side of the support fixed in the basal plate;

a position adjusting member, which is moved upward and downward by the position adjusting motor;

multiple connecting parts, which are installed at the lower side of the position adjusting member and hingedly connected to the support member; and a screw shaft, which is threadedly coupled with the position adjusting member and connected to the position adjusting motor through a bevel gear part.

5. The apparatus as set forth in claim 4, wherein the position adjusting member is installed in a manner such that the one side of which a slider is attached thereto, and the position adjusting member is connected to a guide installed at the lower portion of the support to be moved upward and downward.

6. The apparatus as set forth in claim 3, wherein the intermittent operator includes:

a motor installed on one side of the position adjusting member;

a plate-shaped drum rotated by the motor; and an arm, in which one end is hingedly connected to the edge portion of the drum and the other end is hingedly connected to the long end of the support member.

7. The apparatus as set forth in claim 3, wherein the support member has a shape of a reclined and inverted L, in which its short end is joined with the pressing roller so as to enable the pressing roller to be rotated and its long end is hingedly connected to the intermittent operator.

* * * * *